(12) United States Patent
Holowczak et al.

(10) Patent No.: US 6,174,481 B1
(45) Date of Patent: Jan. 16, 2001

(54) METHOD FOR FORMING CAST TOOLING FOR POLYMER MOLDING

(75) Inventors: John E. Holowczak, South Windsor; Wayde R. Schmidt, Pomfret Center; Joseph V. Bak, Eastford, all of CT (US); Blair V. Souder, Dalton, MA (US)

(73) Assignee: Lear Automotive Dearborn, Inc., Southfield, MI (US)

( * ) Notice: Under 35 U.S.C. 154(b), the term of this patent shall be extended for 0 days.

(21) Appl. No.: 09/151,048

(22) Filed: Sep. 10, 1998

(51) Int. Cl.[7] .................................................. B29C 67/00
(52) U.S. Cl. ........................................... 264/225; 264/220
(58) Field of Search ............................... 264/28, 220, 225

(56) References Cited

U.S. PATENT DOCUMENTS 5,658,506 * 8/1997 White et al. ............................. 264/28
5,785,914 * 7/1998 Kress et al. ........................... 264/226

* cited by examiner

Primary Examiner—Christopher A. Fiorilla
(74) Attorney, Agent, or Firm—MacMillan, Sobanski & Todd, LLC

(57) ABSTRACT

A method for rapidly forming a cast tool adapted for plastic molding includes preparing a uniform mixture of a castable material. A pattern is provided for a desired object to be formed by molding. The castable mixture is applied to the pattern. A continuous structure is cast within the castable material. The castable material is then cured to form a tool.

11 Claims, 1 Drawing Sheet

METHOD FOR FORMING CAST TOOLING FOR POLYMER MOLDING

BACKGROUND OF THE INVENTION

This invention relates to an improved tool for short to intermediate production run use.

Complex-shaped plastic articles are typically formed by either injection molding or compression molding techniques. Typically, the tool or mold utilized in the molding operation is produced from a metal such as steel. The utilization of a tool made from steel is generally appropriate when the tooling will be used to produce in excess of 50,000 components from the tool. Because of the high cost of producing a tool made from steel, a steel tool is generally only selected when large numbers of components will be produced from the tool as the cost can be more easily amortized over a large number of components. However, when the desired quantities of a plastic article or component only range from hundreds to tens of thousands, the cost of producing a machined steel tool can often be prohibitive.

Since aluminum can be machined more rapidly than steel, aluminum has been a somewhat less expensive alternative to steel. Additionally, aluminum tooling is not generally suitable for filled plastics and/or intermediate to high volume use due to its poor abrasion resistance.

In addition to the expense associated with steel and aluminum tooling, it is necessary in the plastics industry to have the capability to rapidly prototype plastic components by utilizing techniques which are as close as possible to those techniques which will be used in the actual production process. For example, in the automobile industry, an automobile manufacturer may wish to field a small test fleet of vehicles. It is often the goal of these test fleets to closely mimic the form, fit, and the function of the production vehicle. For this use, steel or aluminum tooling could be too expensive.

Cast tooling provides the ability for short run, rapidly fabricated tooling. Cast tooling is commonly formed of castable materials such as epoxy, silicone or urethane resins, with or without ceramic or metal fillers. In the process of fabricating a cast tooling, a pattern is made from a suitable material, such as plastic, wood, steel, and/or aluminum, and the pattern is placed in a cavity. A castable material such as epoxy is then poured around the pattern. Then the epoxy cures and the pattern is removed. The resultant tool or mold is suitable for producing parts in quantities of generally less than 100 pieces.

While cast tooling is much less expensive than traditional steel tooling it is subject to several drawbacks. First, the cast tool has a reduced strength and elastic modulus compared to a metal tool and distorts under the pressure exerted under typical injection molding and compression molding applications. Second, the cast tooling has a lower thermal conductivity than a metal tool which can result in longer mold cycle times and can contribute to difficulty in solidifying plastics in articles having thicker cross-sections. Third, the cast tool is mechanically weak as compared with metallic tools. This problem manifests itself in the breakage of thin cross-section mold areas during use. Finally, the cast tools can typically only be used in a temperature range of approximately 300 to 350° F. (150 to 180° C.) which can limit the types of plastics or filled plastics that can be utilized in combination with the cast tool for injection molding.

In an attempt to improve the thermal conductivity of polymer based cast tools, such as the epoxy castings, additives such as aluminum or silicon carbide powder or fillers have been added to the castable material. These types of additives are dispersed within the castable material in a discontinuous manner. These fillers (e.g., aluminum) also provide a mechanism to channel the heat given off (exotherm) produced during resin curing and impart additional abrasion resistance to the cast tool (e.g., silicon carbide). However, in general, it was found that the addition of these powders or fillers to cast systems reduce the mechanical strength of the cast tool relative to its unfilled resin by producing defects in the cured structure. This use of discontinuous fillers results in marginal cast tooling; limiting the total number of parts that can be made.

Accordingly, it would be desirable and advantageous to have a method for rapidly forming tooling for plastic molding which is suitable for use in short to intermediate length production runs, which is less expensive than metallic tooling, such as steel, and which provides the ability to prototype parts using a "near production" process so that all aspects of both the prototype part and the production thereof can be analyzed and observed. This includes the ability to affect heat transfer rates during molding that mimic the heat transfer rates of production steel tooling.

SUMMARY OF THE INVENTION

The present invention is directed to providing a method for rapidly forming a tool adapted for plastic molding which is more convenient and more durable than the prior art. In one main aspect of this invention, the material utilized for the tool is a castable material. The cast tool can be formed by preparing a mixture of stable material, providing a pattern for a desired object to be formed by molding, applying the castable mixture to the pattern, casting a co-continuous structure with the castable material, and then curing the mold to form the tool.

According to the method, a cast tool can be rapidly formed which does not require complex machining, is abrasion resistant, mechanically strong, is highly thermally stable, and, therefore, is suitable for producing hundreds to thousands of molded components.

In another feature of the present invention, the continuous structure has higher thermal conductivity than the castable, which makes the tooling more suitable for plastic molding operations. This is true since the cycle times of the molding operation can be reduced as more heat is transferred away from the plastic article, enabling it to solidify faster than prior art tooling.

In another aspect of the present invention, the co-continuous reinforcing structure incorporated into the castable material comprises a continuous matrix of structure rather than a discontinuous filler. The continuous reinforcement provides a continuous pathway for heat to be efficiently removed from the surface of the tool and away from the molded part. The castable material including the continuous reinforcement provides a continuous matrix which itself can provide increased mechanical strength to the cast tool. The continuous structure is a co-continuous composite structure wherein the continuous phase is continuous and penetrable by the cast material, the cast material also being continuously disposed.

The use of a continuous structure cast within a castable material can also provide enhanced tool stiffness, enhanced abrasion resistance, and enhanced compressive strength. Additionally, the method of forming the cast tooling can be accomplished utilizing patterns made from stereolithographic polymer, machined aluminum, steel, plastic, or other suitable materials and methods known to those skilled in the art.

The present invention is also directed to providing a method for rapidly forming a tool adapted for plastic molding which is more convenient and more durable than the prior art. In one main aspect of this invention, the material utilized for the tool is a ceramic material. The ceramic tool can be formed by preparing a uniform mixture of ceramic particles in a vehicle, providing a pattern for a desired object to be formed by molding, applying the ceramic mixture to the pattern, solidifying/interlocking the ceramic particles together to form a mold, and then heat treating the mold.

According to the method, a ceramic tool can be rapidly formed which does not require complex machining, is abrasion resistant, mechanically strong, is highly thermally stable, and, therefore, is suitable for producing hundreds to thousands of molded components.

In another feature of the present invention, the ceramic materials are thermally conductive which makes the tooling more suitable for plastic molding operations as the cycle times of the molding operation can be reduced as more heat is transferred away from the plastic article enabling it to solidify faster than prior art tooling.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF A PREFERRED EMBODIMENT

Figure 1:
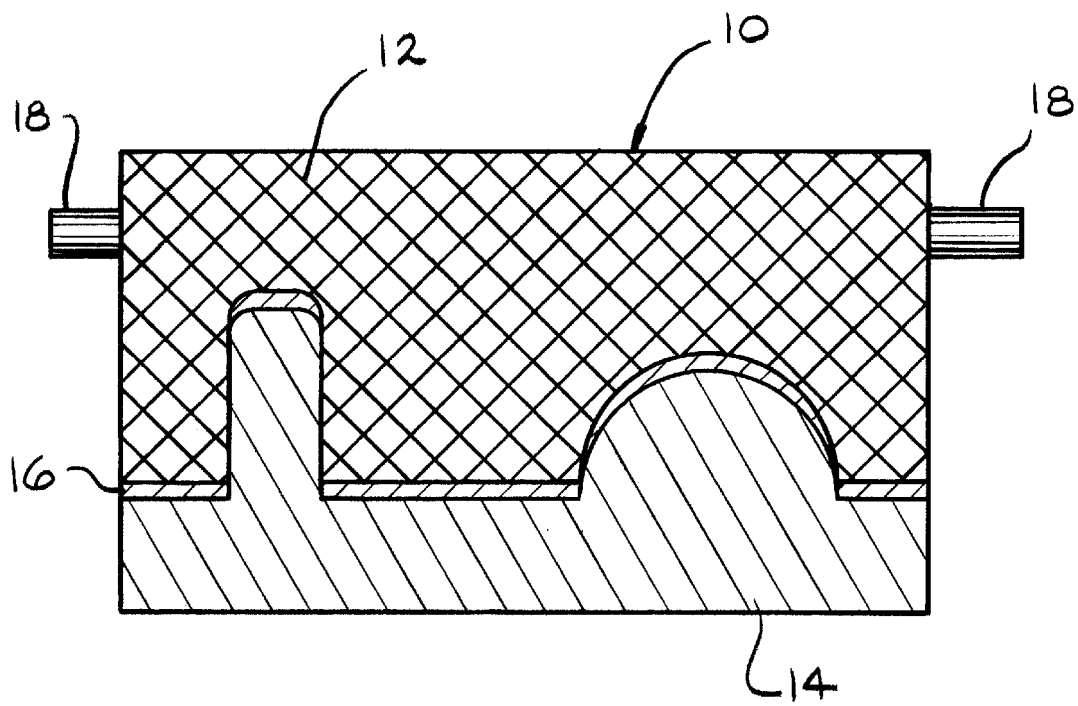
FIG. 1 is a schematic illustration of a cast tool according to the present invention.

Referring to FIG. 1, a cast tool 10 is formed from a continuous matrix structure 12 to impart enhanced thermal and mechanical properties including thermal conductivity, mechanical strength, and desired surface properties. The tool 10 is preferably a mold or mold halve adapted for use in plastic molding. The cast tool 10 incorporating the continuous structural matrix 12 can be constructed by first preparing a suitable pattern 14 for a desired article to be manufactured by injection molding. A suitable pattern 14 can be prepared by any number of techniques known to those skilled in the art including stereolithography, selective laser sintering, or other "rapid prototyping" or "solid free form manufacturing" techniques. The pattern 14 can be constructed by utilizing conventional techniques such as machining, carving, or otherwise shaping metal, plastic, graphite, or other suitable materials in order to fabricate a specific pattern.

A uniform mixture of a castable material in a suitable carrier or vehicle, if necessary, can be prepared by mixing the castable material with a suitable vehicle or carrier such as a solvent. The castable material can include, for example, materials such as epoxy, silicone, polymeric resins such as polyurethane, ceramic materials and mixtures thereof. The mixture of the castable material can also include additives or fillers to alter characteristics of the castable material such as improving thermal conductivity, heat resistance or abrasion resistance. Additives or fillers can include aluminum or silicon carbide. The mixture can additionally be degassed prior to casting as is well known to those skilled in the art.

The uniform mixture of castable material is then applied into a cavity containing the pattern 14. This step is preferably carried out at a reduced pressure. The castable material is then cast against the pattern 14 in one or more casting steps to deliver the desired cast tool. The casting can include any number of surface layers or surface castings 16 for lubrication, improved thermal-stability, or resistance to heat, abrasion and/or solvent interaction. After the application of the castable material to the pattern, the continuous matrix structure 12 is positioned within the cast. Alternatively, the continuous matrix structure 12 can be applied to the pattern prior to the additions of the castable material. The continuous matrix structure 12 can be comprised of materials including metals, ceramics, carbon, plastic or a hybrid material that has high thermal conductivity and/or high mechanical strength. Examples of materials possessing high thermal conductivity include metals such as silver, copper, gold, aluminum, silicon, and tungsten. Suitable ceramic materials can include crystalline carbon such as diamond and glassy carbon, silicon carbide, aluminum nitride, beryllium oxide, and titanium nitride. Other suitable materials formed into a continuous matrix structure can be utilized without departing from the scope of the invention.

Foams are preferable because of their continuous matrix structure and their tailorable porosity/density which determines the mechanical strength of the foam.

Preferably, the aluminum foam is positioned against the pattern and the filled epoxy was cast against the master and into the foam structure. In this manner, a co-continuous matrix is prepared with the epoxy and the foamed structure. The foam can be machined prior to casting to allow for the addition of cooling lines into the tool while maintaining direct contact between the foam and the cooling lines.

The mechanical strength of the continuous matrix structure 12 is determined by the density and porosity of the structure of the continuous matrix and can be chosen based on the performance requirements of the tool to be cast.

The continuous matrix structure 12 is preferably a co-continuous structure. That is, the structure is continuous and penetrable by the castable material and is essentially co-extensive with the castable material. The castable material can penetrate the voids and interstitial spaces of the continuous matrix structure. The co-continuous structure can provide either or both structural reinforcement and enhanced or improved thermal conductivity to the cast tool.

Preferably, the material comprising the co-continuous structure 12 is a metal such as a silver, copper, gold, aluminum, silicon, or tungsten. Preferably, the metal material is in the form of a metal foam such as an aluminum metal foam (Duocel 6101, ERG). Other metal foams such as copper, silver, and gold, for example, can also be utilized with the present invention. Additionally, cellular or other matrix-like materials can be utilized, such as, silicon carbide, carbon, titanium nitride, aluminum nitride, or other similar continuous ceramic foams can be used in the present invention. The continuous matrix structure 12 can also be constructed of lattice block material (LBM, Jamcorp).

After the continuous matrix structure 12 has been positioned within the cast, any remaining casting material is then further cast around the continuous matrix structure 12 so that it can bond to any previously cast layers. It is preferable to have the cast material bond to the continuous matrix structure 12 to improve the mechanical strength of the overall cast tool.

The continuous matrix structure 12 also allows the tool to be modified so as to provide passages or channels 18 for supplemental functions, such as for cooling purposes. Cooling lines (not shown) can be positioned in close proximity to the continuous matrix structure 12 and castable material and can be utilized to facilitate heat flow into or away from a part being molded with the cast tool.

Following casting, the tool containing the continuous matrix structure 12 is then cured, fired, or processed in subsequent steps according to the requirements of the castable material. For example, epoxy resin systems may require a prolonged curing time at room temperature followed by an additional curing time at an elevated temperature. Similarly, ceramic castings may require additional steps such as a binder burn-out cycle followed with additional high temperature heat treatments or a low temperature freezing step to lock together the particles of ceramic material followed by a high temperature debinding step.

A ceramic tool, such as a mold or mold halve adapted for use in plastic molding, can be prepared by first preparing a suitable pattern for a desired article to be manufactured by injection molding. A suitable pattern can be prepared by any number of techniques known to those skilled in the art including stereolithography, selective laser sintering, or other "rapid prototyping" or "solid free form manufacturing" techniques. Additionally, the pattern can be constructed by utilizing conventional techniques such as machining, carving, or otherwise shaping metal, plastic, graphite, or other suitable materials in order to fabricate a specific pattern.

A uniform mixture of ceramic particles in a suitable liquid vehicle can be prepared by mixing raw ceramic powder(s) with water or other suitable vehicle. The particulate ceramic material employed is preferably a ceramic material which does not undergo significant shrinkage upon densification, bonding, or curing. This characteristic aids in the maintenance of high dimensional tolerances and accuracies when forming a ceramic tool or mold.

Preferably, the ceramic materials utilized in forming the ceramic tooling possess high thermal conductivity which, as discussed above, impart speed in the solidification of molded plastic parts and in a reduction of cycle time. Suitable ceramic materials include glass bonded silicon carbide, reaction bonded silicon carbide, siliconized silicon carbide, cement bonded silicon carbide, reaction bonded silicon nitride, lightly or partially sintered aluminum nitride, and cement or chemically bonded silicon carbide and aluminum nitride. Aluminum nitride, silicon carbide, silicon nitride and titanium nitride are all suitable ceramic materials possessing good thermal conductivity characteristics. Accordingly, the use of these materials as major constituents of the ceramic mixture impart high thermal conductivity to the completed ceramic tool or mold. Additionally, additives which effect the characteristics, such as strength, of the ceramic mixture, can be added. This can include fibers or other structural matrices.

The uniform ceramic mixture is then applied into a cavity containing the pattern therein. The uniform ceramic mixture is poured around the pattern and is vibrated to remove any entrapped air, especially at the mixture/pattern interface. A continuous matrix structure, as described above, can also be incorporated.

After the uniform ceramic mixture has been applied around the pattern, the temperature around the pattern is lowered to a temperature at which freezing occurs in order to lock together the particles of ceramic material. The "green" ceramic mold is then solid enough and in a condition wherein it may be removed from the pattern.

The water or other vehicle can then be removed by various techniques including freeze drying, sublimation, evaporation, or chemical reaction. Various modifications, known to those skilled in the art, such as including additives to prevent the formation of ice crystals, or to increase the strength of the "green" unfired part, can also be included.

The "green" ceramic, now in the form of a mold or tool, is then densified, bonded, or cured in a manner which is appropriate for the particular type of ceramic material utilized. Typically, the "green" ceramic piece is heated to a temperature sufficient to cause the melting or fusion of the ceramic particles. For example, if glass bonded silicon carbide is utilized to form the mold or tool, the material would be heated in either air or an inert atmosphere to a temperature high enough to cause a glass to soften or melt and wet the silicon carbide particles or grains. Then, upon cooling, the glass bonds together the silicon particles or grains. If reaction bonded silicon carbide is utilized to form the mold or tool, the material would first be lightly or partially sintered in an inert atmosphere. Then, the residual porosity of the material would be filled with a carbon forming polymer. The molded piece or tool would then be thermally processed, as is well known to those skilled in the ceramic arts, to convert the polymer to carbon. The mold or tool is then subsequently infiltrated with molten silicon which reacts with the carbon to form silicon carbide with some residual silicon. The finished mold or tool has a high strength and thermal conductivity, which is equal to aluminum, and a smooth surface finish. The abrasion resistance of both materials discussed above exceeds that of aluminum and, in the case of siliconized silicon carbide, exceeds the abrasion resistance of tool steel.

Alternatively, a high thermal conductivity ceramic powder, such as aluminum nitride or silicon carbide, could be shaped utilizing freeze casting, subsequently freeze dried, and then subjected to a low temperature sintering operation (heat treatment) such that good particle-to-particle or grain-to-grain bonding is achieved while overall shrinkage of the article is limited to less than 2% for dimensional control. The mold or tool so formed can be employed as-is, or subjected to further treatment such as infiltration with epoxy or a similar material to enhance the strength and/or surface finish of the tool or mold so formed.

The resultant ceramic tool, mold, or mold halves formed according to the process described above, can then be mounted to an injection molding machine. the tool and/or mold and molding machine are then operated in a normal fashion.

EXAMPLES

Example 1

Aluminum-filled epoxy casting resin (Ciba 4036) was mixed with hardener (Ciba 1511) according to manufacturer recommendations. This material was degassed under reduced pressure, cast into a steel mold and cured according to the manufacturer's specifications. In an alternate casting, a continuous matrix of aluminum metal foam (Duocel 6101, ERG, density 6–8%, 20 pores per inch) was positioned in contact with the bottom of a steel mold of nominal size 1.25 inches×1.25 inches. The aluminum-filled epoxy casting resin was mixed with hardener as before (Ciba 4036R/151 for one hour), degassed, and cast within the open structure of the foam in the mold under reduced pressure. The composite system was cured according to the manufacturer recommendations, resulting in a co-continuous composite structure containing aluminum-filled epoxy and aluminum foam (nominally 1.25 inches×1.25 inches×0.75 inches).

Example 2

An epoxy mold was constructed with aluminum foam at Kodak. A "wing" pattern was used to create the core and cavity details. The mold was constructed by applying a Ciba 4036 resin coat on the parting board containing the pattern. The surface coat was then backed up with aluminum foam material. The foam was machined to conform to the surface of the pattern within about 3/16 of an inch. The foam was then filled with Ciba 4036 resin by utilizing a vacuum chamber to draw out the trapped air in the foam. A thermocouple was installed on the stationary side of the mold about 3/16" from the surface of the cavity. Cooling passages were drilled in each half through the area containing the aluminum foam. After the mold was completed by installing mounting brackets and ejector pins, it was run through two tests as follows. In each test, high impact polystyrene plastic parts were molded. The cylinder temperatures were set at 426–464° C.

TEST 1

The mold was used to mold parts on a 50 ton Technoplas molding machine. During this test, the mold was run with and without water until the mold reached an equilibrium temperature. While the injection and cure times were identical for the two runs with and without water, the test without water was run with an additional mold open delay time of 20–30 seconds to allow for the mold surfaces to be cooled to 115–120° F. with a stream of compressed air before the molding cycle continued. Due to the molding cycle differences, the mold temperature measurements for each case were somewhat inconsistent and not considered to be comparable. Subsequent to the test, it was decided to repeat the test with the same mold open time for each case. In the case which used cooling water, the internal probe in the stationary half stabilized at about 70° F.

TEST 2

Another test was made on the same molding machine. In this case, the probe in the stationary mold was not measured. Two infrared (IR) guns were used to measure the core (movable) and cavity (stationary) surface temperatures. An overall cycle time of 70 seconds with a three second mold open delay was used for each run with and without water. After 100 cycles, the following data was recorded:

| Water, 48° F. | Core, ° F. | Cavity, ° F. | Comments |
| --- | --- | --- | --- |
| OFF | 111 | 132 | Stability took >50 cycles |
| ON | 84 | 88 | Stable in 20–25 cycles, parts were flatter than "off" parts |
| Diff. | 27 | 44 | |

A total of about 300 shots or molding cycles were made on the mold during the two tests. There was no apparent mold degradation.

The use of cooling water passing through the aluminum block had an effect on lowering the mold surface temperature.

Example 3

A surface coating of Ciba silicon carbide-filled epoxy resin (3260) was mixed with an appropriate hardener (Ciba 1225) and 20 wt % of additional aluminum filler (Ciba RP38 grain), degassed, and cast into a 3.75 inch×1.5 inch mold. A portion of aluminum metal foam (Duocel 6101, 6–8% dense, 20 ppi) was positioned into the surface coating and a mixture of Ciba 4036 resin and 1511 hardener was cast into the foam structure and adjacent to the surface casting. This composite structure was cured at room temperature for twenty-four hours then cured at elevated temperature according to the specifications for 4036/1511 curing. The resultant cured casting contained an abrasion resistant surface coat and a co-continuous backing of aluminum foam and aluminum-filled epoxy.

Example 4

A casting was prepared using Cotronics Rescor™ Cer-Cast SiC (Product 770) and the Duocel continuous aluminum foam to form a co-continuous structure. Preparation and curing of the castable were performed according to the manufacturer specifications.

Example 5

Ceramic Tools

A pattern was produced from machine steel. The pattern had intricate detailing including a logo, pins, holes, steps, protrusions, and slots at heights, depths, draft angles and radiuses typical of complex plastic parts utilized in the HVAC, automotive, and aerospace industries. A freeze cast glass bonded silicon carbide mold was made utilizing the pattern. The mold halves were dried and fired in an air atmosphere to bond the ceramic material. No subsequent machining of the mold halves was required. The mold was affixed to a TOYO 90 ton injection molding machine and was used to mold five parts from Amoco 3950 polypropylene (melt flow index of 35).

The same pattern was used to fabricate another freeze cast mold. The mold was fired in an inert atmosphere to 1450° C. to impart greater strength to the material. The mold was used to successfully mold over 150 parts from GE Noryl 844 (melt flow index of 10).

These examples illustrate that the technology is suitable for production runs depending upon the part complexity, the melt flow index of the polymer utilized, and the injection and clamping pressures employed.

A preferred embodiment of this invention has been disclosed; however, a worker of ordinary skill in the art would recognize that certain modifications come within the scope of this invention. For that reason, the following claims should be studied to determine the true scope and content of this invention.

What is claimed is:

1. A method for forming a cast tool adapted for plastic molding, said method comprising the steps of:

preparing a uniform mixture of a castable material;

providing a pattern for a desired object to be formed by molding;

applying the castable material to the pattern;

casting a continuous structure within the castable material, the continuous structure being co-continuous with the castable material; and curing the castable material to form a tool.

2. A method according to claim 1, wherein the material comprising the co-continuous structure includes a matrix.

3. A method according to claim 2, wherein said matrix is a foam.

4. A method according to claim 3, wherein said metal matrix includes a metal foam.

5. A method according to claim 3, wherein said foam is selected from the group consisting essentially of diamond, glassy carbon, and ceramic materials.

6. A method according to claim 2, wherein said matrix is a metal matrix.

7. A method according to claim 1, wherein the castable material is a ceramic material.

8. A method according to claim 1, wherein the castable material includes an epoxy material.

9. A method according to claim 1, wherein the castable material includes a ceramic material.

10. A method according to claim 1, wherein the castable material includes a polymeric material.

11. A method according to claim 1, further including the step of providing passageways in the continuous structure.

* * * * *